Sept. 20, 1966  M. J. TAUSCHEK  3,273,856
VALVE STEM RETAINER LOCK
Filed Dec. 26, 1963
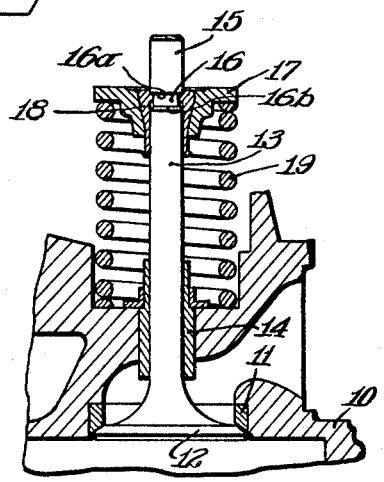
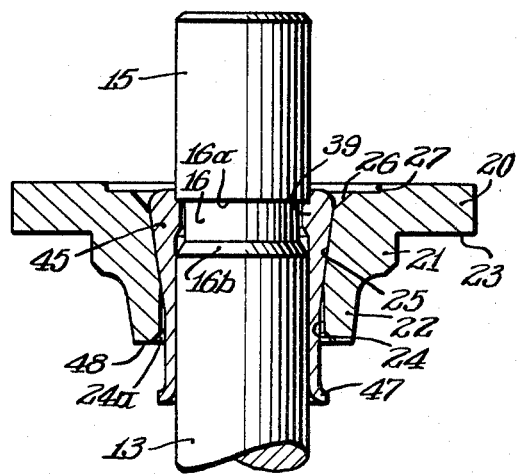
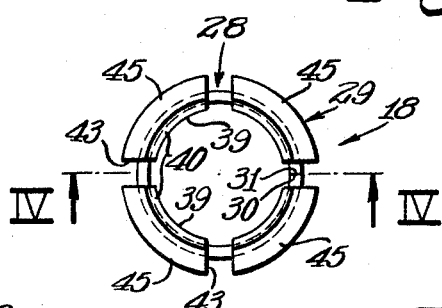
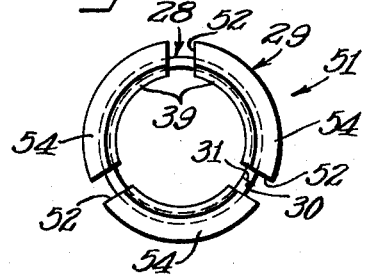
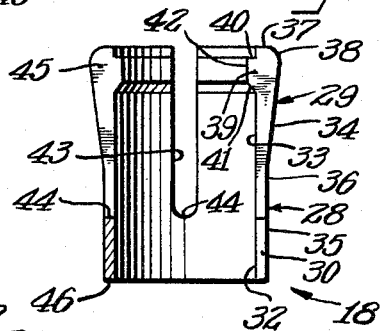
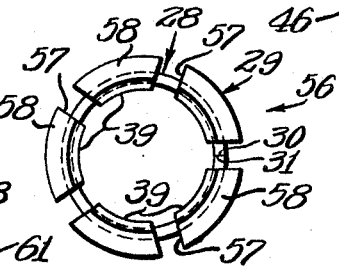
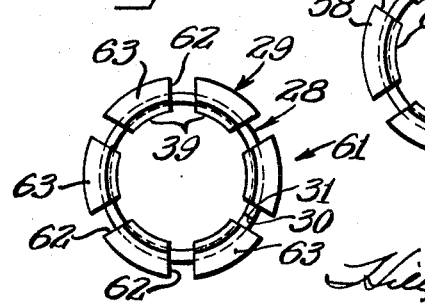
INVENTOR.
Max J. Tauschek
BY
ATTORNEYS

United States Patent Office 3,273,856
Patented Sept. 20, 1966

3,273,856
VALVE STEM RETAINER LOCK
Max J. Tauschek, South Euclid, Ohio, assignor to
TRW Inc., a corporation of Ohio
Filed Dec. 26, 1963, Ser. No. 333,484
12 Claims. (Cl. 251—337)

This invention generally relates to an easily assembled one piece valve spring retainer lock and more particularly relates to a spring retainer and lock assembly which can be easily snapped onto a stem into locking position and removed from the stem without damage or disassembly.

In conventional poppet valve assemblies the tip end of the poppet valve stem has a spring retainer locked thereon to form the bottoming means for the valve closing spring. For this purpose the stem is provided with a peripheral groove near its tip end for receiving the ribs or beads of valve spring retainer locks. These locks usually consist of a pair of wedge tapered semicylindrical internally ribbed segments. The locks when positioned around the valve stem provide a wedge fit in the tapered bore of the valve spring retainer. These semicylindrical locks are mass produced on automatic roll forming and shearing machines which flatten the longitudinal edge surfaces thereof. The flattened surfaces do not engage the bore of the valve spring retainer and since limited wedge contact with the bore can only result, the spring retainer can rock relative to the stem causing premature wear and improper spring seating. Attempts to avoid this rocking problem by the use of three piece stem locks has not been successful because of the difficulty in assembling such small lock segments around the valve stem and in a spring retainer.

Further, the roll forming of the prior art multiple piece retainer locks requires positioning of the locking ribs or beads at approximately the longitudinal center of the locks thereby providing stem gripping areas on both sides of the beads. These separated gripping areas subject the stem to severe stress and tend to rupture the stem at the groove portion thereof. Further, tolerance variations frequently cause the gripping to be confined at the beads or ribs which also unduly stress the valve stem groove. Since the segments of multiple piece retainer locks must be spaced apart to accommodate wedge gripping of the valve stem, oil leakage paths are opened up through the assembly permitting oil to drain down the valve stem and leak into the valve port.

The present invention now eliminates the deficiencies of the multiple piece retainer locks by providing a one piece tubular lock which not only seals on the valve stem but also insures more than a two point contact with the spring retainer and has a large continuous stem gripping area located inboard from the locking rib or bead to minimize stem rupturing stresses.

The locks of this invention are one piece metal cylinders with slotted expansible and contractible ends containing the internal locking ribs or beads for seating in the valve stem groove. The locks are tapered on the outer periphery thereof to be wedge engaged around the entire periphery by the conical bore of the spring retainer. The slotted ends of the locks have more than two slots therein to provide at least three arcuate fingers therebetween for engaging the retainer bore. This provides at least a three point contact which eliminates any possibility of rocking movement between the locks and retainer. The tubular locks are split but are sized to have an interference fit with the valve stem when the split gap is closed under the wedge action of the spring retainer bore and the complete annulus thereby provided beneath the finger segments seals against oil drainage through the retainer along the valve stem.

If desired the locks of this invention can be preassembled in the spring retainers by providing an outturned lip on the end thereof. The resulting assembly can be easily snapped onto a valve stem to simplify valve spring assembly operations.

The locks of this invention are easily removed from the valve stems by spreading the slotted ends thereof sufficiently to expand the beads out of the valve stem groove. Since the beads are located at the ends of the lock minimum expansion and contraction movements are provided for seating and removing the beads from the stem groove.

It is then an object of this invention to provide a one piece valve stem retainer lock which will not permit rocking of the spring retainer on the valve stem.

Another object of this invention is to provide a tubular valve spring retainer lock which will contract into wedge gripping engagement with a valve stem exclusively on one side only of the stem groove and will always have more than a two point contact with the spring retainer.

A further object of this invention is to provide a tubular spring retainer lock with at least three contractible internally ribbed segments.

A specific object of the invention is to provide a one piece valve stem retainer lock with a split tubular base and a plurality of expansible and contractible arcuate segments extending longitudinally from the base and having internal ribs at the ends thereof and being thickened as they approach the ends for providing a frusto conical external surface to be wedge seated in the tapered bore of a spring retainer.

Another specific object of this invention is to provide a steel or aluminum one piece valve stem retainer lock with a slotted expansible end containing locking ribs for seating in the valve groove and providing elongated wedge gripping areas located completely on one side of the ribs.

Another and specific object of this invention is to provide a spring retainer and lock assembly adapted to be snapped onto a valve stem and locked in the stem groove without the aid of tools.

Other objects of this invention will be apparent to those skilled in this art from the following detailed description of the annexed sheet of drawings which, by way of preferred embodiments, illustrates several examples of the invention.

In the drawings:

FIGURE 1 is a partial longitudinal cross-sectional view with parts in elevation of a poppet valve assembly equipped with a valve retainer constructed in accordance with the principles of the present invention.

FIGURE 2 is an enlarged partial longitudinal cross-sectional view with parts in elevation illustrating the manner in which the valve retainer lock of the present invention cooperates with the valve stem.

FIGURE 3 is a top elevational view of a valve retainer lock constructed in accordance with the principles of the present invention.

FIGURE 4 is a longitudinal cross-sectional view with parts in elevation of the valve retainer lock taken along lines IV—IV of FIG. 3.

FIGURE 5 is a top elevational view similar to FIG. 3 of another embodiment of a valve retainer lock constructed in accordance with the principles of the present invention.

FIGURE 6 is a top elevational view similar to FIG. 3 of another embodiment of a valve retainer lock constructed in accordance with the principles of the present invention.

FIGURE 7 is a top elevational view similar to FIG. 3 of still another valve retainer lock constructed in accordance with the principles of the present invention.

As shown in the drawings:

Referring to FIG. 1, reference numeral 10 generally indicates an engine part such as for example a portion of the cylinder head of an internal combustion engine.

Seated within an appropriate recess in the cylinder head 10 is an annular valve seat 11 composed of a material capable of withstanding a high temperature and corrosion conditions which the valve assembly is subjected. A poppet valve 12 is seated against the valve seat 11 and has a rod-like stem portion 13 slidably received within a valve stem guide 14. The top end 15 of the stem 13 has a conventional retainer lock groove 16 having a flat top annular wall 16a and a lower frusto-conical wall 16b diverging towards the valve 12. A tubular valve spring retainer 17 surrounds and is locked to the valve stem 13 by a valve stem retainer lock 18, which will hereinafter be described in greater detail. A coil spring 19 surrounds the stem 13 and has one end bottomed against the retainer 17 and the opposite end bottomed against a seat in the cylinder head 10. The spring holds the valve in its closed position.

Referring to FIGS. 1 and 2 the valve spring retainer 20 has three concentric cylindrical portions 20, 21 and 22 with the upper portion 20 having an annular flat shoulder or abutment surface 23 adapted to engage the one end of the spring 19. The lock receiving spring bore of the retainer 20 is provided with an inner cylindrical bore 24 having a beveled mouth 24a, a frusto conical bore 25 diverging from the cylindrical bore 24 and extending along the major length of said retainer bore to a short frusto-conical wall 26 diverging from said wall 25 to a short cylindrical counterbore 27.

Referring to FIGS. 2–4, the retainer lock 18 comprises a split tubular base portion 28 and a segmented top portion 29. The split tube base portion 28 has its end walls 30 and 31 abutted together to form an interference seal fit with each other to prevent oil leakage therebetween. The thickness of the lower base portion is uniform throughout and has a cylindrical inner wall surface 32. The segmented upper portion 29 also has an inner cylindrical wall surface 33 of equal diameter to the inner surface 32 of the lower base portion and extending concentric therewith. The upper portion 29 has an outer wall surface 34 which diverges from the outer cylindrical surface 35 of the lower portion 28 at 36 to present a frusto-conical configuration. Therefore, as illustrated, the top portion 29 gradually increases in thickness from bottom or base portion 28 to its end 37 which is rounded as indicated by reference numeral 38. Inwardly spaced a short distance from the end 37 is a rib 39 which projects inwardly from the inner surface 33. The rib 39 is at or near the top of the retainer lock 18 and has a flat radial top face 40 and a bottom face 41 that diverges from the inner wall face 42 at an angle of approximately 30° towards the inner cylindrical wall 33 of the upper portion 29.

Four longitudinal slots 43 having parallel side walls facing each other extend for a distance greater than one-half the length of the retainer lock from the end 37 through the top portion 29 into the bottom portion 28. The slots 43 have rounded end walls 44 ending in the bottom portion less than halfway through said bottom portion. The slots 43 are equally spaced from each other to provide four equal expansible arcuate segments 45.

The retainer lock 18 fits freely in the bore of the spring retainer 17 with the tubular base portion 28 of the lock having a free sliding fit in the cylindrical bore 24 and with the tapered segmented top portion 29 of the lock having wedge fit engagement with the frusto-conical bore 25 of the retainer. When the top portion 29 of the lock is bottomed on the bore 25 of the retainer, the base 28 projects beyond the beveled mouth 24a of the bore 24 and if it is desired to maintain the lock and retainer in assembled relation, the end 46 of the lock is spread or flanged to form a lip 47 of larger diameter than the bore 24. This lip 47 will cooperate with the large segmented end of the lock to hold the lock in the bore of the retainer while of course accommodating free endwise movement of the lock in the retainer.

It will be understood of course that the retaining lip 47 may be eliminated from the lock whenever it is desired to supply the locks and retainers in disassembled relation.

In operation the lock 18 is slipped over the top end 15 of the valve stem 13 and in its uncontracted condition, the split base end portion 28 of the lock has a free sliding fit with the valve stem. The tapered bottom faces 41 of the ribs 39 will automatically spread the arcuate segments 45 of the segmented top portion 29 of the lock as the lock is pushed over the tip end 15 of the valve stem for accommodating sliding movement of the lock to the level of the groove 16 whereupon the resiliency of the segments 45 will snap the ribs 39 into the groove. It will be noted from FIG. 2 that the groove 16 is wider than the ribs 39 and that the flat top faces 40 of the ribs abut the flat shoulder 16a of the groove while the tapered bottom faces 41 of the ribs are spaced above the tapered bottom wall 16b of the groove. It will also be noted that the groove 16 is deeper than the contracted position of the inner faces 42 of the ribs so that these faces are always spaced outwardly from the bottom of the groove.

The load of the spring 19 on the spring retainer 17 forces the retainer into wedge lock engagement with the segmented end 29 of the retainer lock 18. This wedge locking contracting force on the lock 18 first closes any gap between the split ends of the base portion 28 of the lock and brings these ends 30 and 31 into abutted together relation. At the same time the base 28 has the inner wall 32 thereof contracted into an interference fit relation with the stem 13. Then the segmented top portion 29 of the lock is contracted to bring the walls 33 of the segments into tight gripping engagment with the valve stem while the groove shoulder 16a thrusts against the rib faces 40 to hold the lock against axial slipping on the stem. The actual locking of the lock 18 on the stem 13 is accomplished by the frictional gripping action of the arcuate wall portion 33 on the stem and the only function of the bead or rib 39 is to hold the stem against slipping in the lock while this gripping force is being established. It will also be noted that all of the gripping area is inboard of the rib 39 thereby minimizing stresses tending to rupture the valve stem at the groove.

Since four arcuate segments 45 are provided by the lock 18 and since each of these segments act as a spring finger in the tapered bore 25 of the spring retainer, at least four contact areas are maintained in the spring retainer bore by the lock and the spring retainer cannot rock relative to the stem. Likewise since the gripping surfaces 33 on the inner diameter of the segments 45 provide at least four contact areas between the stem and the lock, the stem cannot rock within the lock. As a result the abutment surface 23 for bottoming the valve spring 19 is securely fixed relative to the valve stem.

For removing the lock and retainer from the valve stem it is only necessary to remove the spring load on the retainer as by collapsing the spring and to then drop the retainer down on the tubular end 28 of the lock. For this function the tapered shoulder 16b of the stem groove can mate with the tapered bottom face 41 of the rib 39 to hold the lock against dropping beyond the groove. With the lock loose in the bore of the retainer, a suitable spreading tool can be inserted in the slot 43 of the lock to spread the arcuate segments 45 sufficiently for moving the ribs 39 out of the groove whereupon the assembly can be retracted off of the end 15 of the stem.

In the embodiment of FIG. 5, a modified lock 51 is provided which is identical with the lock 81 except that the top segmented portion 29 has three slots 52 therein providing three expansible arcuate segments 54 instead of the four segments 45 of the lock 18.

The further embodiment 56 in FIG. 6 is identical with the lock 18 except that the upper portion 29 is provided with five slots 47 providing therebetween five expansible arcuate segments 58.

In a still further embodiment 61 of FIG. 7 the lock has six slots 62 providing six arcuate segments or fingers 63.

The modifications of FIGS. 5 to 7 operate in the same general manner as the four segment or finger embodiment of FIGS. 1 to 4, it being understood that as the number of expansible segments or fingers increase, the degree of spreading or expansion required for assembly of the lock onto the valve stem is reduced.

At least three segments or spring fingers are desired on the locks of this invention in order to provide at least three points of contact between the lock and the spring retainer and thereby prevent any relative rocking motions between the stem and retainer. Further, it is preferred to position the ribs 39 at the top end of the retainer locks of this invention in order to place the stem gripping areas of the locks inwardly from the stem groove and thereby reduce stresses on the valve stem such as occur when the gripping areas are separated on opposite sides of the rib area.

Although the above invention was described in accordance with the preferred embodiments thereof, it is apparent that modifications and variations may be effected without departing from the scope of the novel concepts of the present invention and it will be understood that I intend that this invention be limited only by the scope of the hereunto appended claims.

I claim as my invention:

1. A valve spring retainer lock which comprises a one-piece metal tube having at least three slots extending inwardly a given distance from one end thereof and providing therebetween at least three expansible and contractible arcuate segments, said segments having inner peripheral gripping walls which are of a constant diameter along substantially their entire axial length which is equal to the inner diameter of said tube at said given distance from said one end thereof and external tapered walls diverging to the free ends of the fingers, the ends of the fingers having inturned ribs beyond the gripping walls adapted for locating the lock axially on a stem.

2. A one-piece valve retainer lock normally having a cylindrical bore therethrough comprising a split tubular base portion, a tubular upper portion extending from said base portion and having a thickness that gradually increases as the upper portion extends from the base portion, a lock rib extending radially inward from the upper portion, and said upper portion being divided into at least three axially extending expansible arcuate segments.

3. A one-piece valve retainer lock comprising a split tubular base portion, a tubular upper portion extending from said base portion and having an inner diameter equal to and concentric with the inner diameter of the tubular base portion and having a thickness that gradually increases as the upper portion extends away from the base portion, a rib extending inwardly from the inner diameter of the upper portion adjacent the end thereof, at least three rectangular slots formed in said upper portion and extending the length thereof, and one of said slots terminating with the split ends of the base portion in the longitudinal center thereof.

4. A one-piece valve retainer lock comprising a split tubular base portion, a tubular upper portion extending from said base portion and having an inner diameter equal to and concentric with the inner diameter of the tubular base portion, said upper portion having a thickness that gradually increases as the upper portion extends from the base portion, a rib extending inwardly from the inner diameter of the upper portion adjacent the end thereof, said rib having a flat radial side wall facing said end and an angular wall facing the base portion, and at least three equally spaced slots extending the length of said upper portion and terminating at said base portion.

5. A one-piece valve retainer lock comprising a split tubular base portion having a uniform thickness, a pair of base end walls defining a split in the tubular base portion, said end walls forming a complementary interference seal fit with each other, a tubular upper portion extending from said base portion and having a uniform inner diameter equal to and concentric with the inner diameter of the tubular base portion, said upper portion having a thickness that gradually increases as the upper portion extends from the base portion, said upper portion defining an open-mouth end, a rib extending inwardly from the inner diameter of the upper portion adjacent the mouth thereof, said rib having a flat radial side wall facing the mouth and an angular wall facing the base portion, at least three equally spaced slots formed in said upper portion extending the length thereof and terminating a predetermined distance within the base portion, and one of said upper portion slots terminating with the base portion split in the center thereof.

6. A one-piece valve spring retainer lock which comprises a metal tube having a cylindrical base portion adapted to embrace the stem of a poppet valve and a plurality of circumferentially separated arcuate finger portions extending generally axially from one end of said base portion, each of said finger portions having a valve stem gripping inner peripheral wall which is of the same diameter substantially throughout its entire axial length as the diameter of said one end of said base portion and a radially inwardly projecting bead beyond the stem gripping area adapted to project into the groove of a valve stem for locating the lock longitudinally on the stem, and each of said fingers having an outer periphery diverging from the base portion to the ends of the fingers and adapted to contract the fingers into gripping engagement with a valve stem upon application of contracting force thereon from a valve spring retainer.

7. A one-piece valve retainer lock comprising a tubular base portion, a tubular upper portion extending from said base portion and having an inner diameter equal to and concentric with the inner diameter of the tubular base portion and having a thickness that gradually increases as the upper portion extends away from the base portion, a rib extending inwardly from the inner diameter of the upper portion adjacent the end thereof, and at least three slots formed in said upper portion and extending the length thereof to divide said upper portion into at least three axially extending expansible and contractible arcuate segments.

8. A one-piece valve retainer lock comprising a tubular base portion, a tubular upper portion extending from said base portion and having an inner diameter equal to and concentric with the inner diameter of the tubular base portion, said upper portion having a thickness that gradually increases as the upper portion extends from the base portion, a rib extending inwardly from the inner diameter of the upper portion adjacent the end thereof, said rib having a flat radial side wall facing said end and an angular wall facing the base portion, and at least three slots extending the length of said upper portion and terminating at said base portion to divide said upper portion into at least three axially extending expansible and contractible arcuate fingers.

9. A one-piece valve retainer lock comprising a tubular base portion, a tubular upper portion extending from one end of said base portion and having an inner diameter which is equal substantially throughout its entire axial length to the inner diameter of said one end of the tubular base portion, said upper portion having a thickness that gradually increases as the upper portion extends from the base portion, a rib extending inwardly from the inner diameter of the upper portion adjacent the end thereof, said rib having a flat radial side wall facing said end and an angular wall facing the base portion, and at least three equally spaced slots extending the length of said upper portion and terminating a predetermined distance within said base portion to divide said upper portion into at least three axially extending expansible and contractible arcuate segments.

10. A one-piece valve retainer lock comprising a split tubular base portion having a uniform thickness, a pair of base end walls defining a split in the tubular base portion, said end walls forming a complementary interference seal fit with each other, a tubular upper portion extending from said base portion and having a uniform inner diameter equal to and concentric with the inner diameter of the tubular base portion, said upper portion defining an open-mouth end, a rib extending inwardly from the the inner diameter of the upper portion adjacent the mouth thereof, said rib having a flat radial side wall facing the mouth and an angular wall facing the base portion, at least three slots formed in the said upper portion extending the length thereof and terminating a predetermined distance within the base portion, and one of said upper portion slots terminating with the base portion split in the center thereof.

11. For use with a grooved stem and a valve spring retainer having a stem receiving bore, a one-piece valve retainer lock comprising a tubular base portion, a tubular upper portion extending from one end of said base portion and having an inner diameter the same as the inner diameter of said one end of the tubular base portion along substantially the entire axial length of said upper portion, a lock rib extending radially inward from the upper portion, said upper portion being divided into at least three axially extending arcuate segments, and said arcuate segments each having stem gripping inner walls and retainer bore gripping outer walls.

12. A one-piece elongated valve retainer lock normally having a bore therethrough of a constant transverse cross-sectional configuration along substantially its entire axial length comprising a split tubular base portion, a tubular upper portion extending from said base portion and having a thickness that gradually increases as the upper portion extends from the base portion, a lock rib extending radially inwardly from the upper portion, said upper portion being divided into a plurality of axially extending expansible arcuate segments.

References Cited by the Examiner
UNITED STATES PATENTS

| | | | |
|---|---|---|---|
| 1,343,552 | 6/1920 | Earle | 279—104 |
| 1,393,348 | 10/1921 | Davenport | 251—337 |
| 1,462,293 | 7/1923 | Mason. | |
| 1,965,718 | 7/1934 | Wiley | 251—337 X |
| 2,172,086 | 9/1939 | Marszalski | 279—23 X |
| 2,279,508 | 4/1942 | Bergan | 287—20.3 X |
| 2,841,128 | 7/1958 | Aiken | 123—188 |
| 2,844,134 | 7/1958 | Sietman | 123—188 |

WILLIAM F. O'DEA, *Primary Examiner.*

ISADOR WEIL, *Examiner.*

A. COHAN, *Assistant Examiner.*